United States Patent
Tsai et al.

(10) Patent No.: US 9,016,580 B2
(45) Date of Patent: Apr. 28, 2015

(54) METHOD OF READING MULTIPLE TWO DIMENSIONAL BARCODES

(71) Applicant: National Cheng Kung University, Tainan (TW)

(72) Inventors: Pei-Hsuan Tsai, Taipei (TW); Chun-Pin Yeh, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 6 days.

(21) Appl. No.: 13/965,916

(22) Filed: Aug. 13, 2013

(65) Prior Publication Data
US 2014/0042229 A1  Feb. 13, 2014

(30) Foreign Application Priority Data
Aug. 13, 2012  (TW) .............. 101129242 A (51) Int. Cl.
*G06K 7/10* (2006.01)
*G06K 7/14* (2006.01)

(52) U.S. Cl.
CPC ............ *G06K 7/1417* (2013.01); *G06K 7/1443* (2013.01)

(58) Field of Classification Search
USPC ......... 235/462.09, 462.01, 375, 383; 340/3.1, 340/10.1
See application file for complete search history.

(56) References Cited

U.S. PATENT DOCUMENTS

| | | | |
|---|---|---|---|
| 2002/0070278 A1* | 6/2002 | Hung et al. | 235/472.01 |
| 2004/0026511 A1* | 2/2004 | Cheung et al. | 235/462.1 |
| 2004/0099741 A1* | 5/2004 | Dorai et al. | 235/462.08 |
| 2010/0213305 A1* | 8/2010 | Kramer et al. | 242/615.3 |
| 2011/0062228 A1* | 3/2011 | Yoon et al. | 235/375 |
| 2012/0211567 A1* | 8/2012 | Herzig | 235/488 |

FOREIGN PATENT DOCUMENTS

CN        102034127 A        4/2011

* cited by examiner

*Primary Examiner* — Allyson Trail
(74) *Attorney, Agent, or Firm* — Muncy, Geissler, Olds & Lowe, P.C.

(57) ABSTRACT

A method of reading multiple two dimensional barcodes includes the steps of obtaining an image including a plurality of positioning patterns and the two dimensional barcodes, defining a reading area within the image according the positioning patterns, dividing the reading area into a plurality of reading blocks, which contain the two dimensional barcodes, respectively, and reading the two dimensional barcodes in the reading blocks individually.

11 Claims, 8 Drawing Sheets

```
S10: obtaining an image, wherein the image includes a plurality of positioning patterns and two-dimensional barcodes S20: defining a reading area within the image according to the positioning patterns S30: dividing the reading area into a plurality of reading blocks so that each of the two-dimensional barcodes is located in one of the reading blocks respectively S40: reading two-dimensional barcodes in the reading blocks respectively
```

METHOD OF READING MULTIPLE TWO DIMENSIONAL BARCODES

CROSS REFERENCE TO RELATED APPLICATIONS

This Non-provisional application claims priority under 35 U.S.C. §119(a) on Patent Application No(s). 101129242 filed in Taiwan, Republic of China on Aug. 13, 2012, the entire contents of which are hereby incorporated by reference.

BACKGROUND OF THE INVENTION

1. Field of Invention

The invention relates to a method of reading a two-dimensional barcode and, in particular, to a method of reading multiple two-dimensional barcodes.

2. Related Art

A two-dimensional barcode is a readable barcode which has another dimension expanded based on a one dimensional barcode. Since the messages that can be carried by a two-dimensional barcode are far more than a one dimensional barcode, a two-dimensional barcode is used more widely with the rapid development of modern technologies, especially in high-tech industries, storage and transportation industries, wholesale and retail industries, which have the needs of marking information onto products cheaply and rapidly. Currently, commonly seen examples include rapid railroad tickets, traceable foods such as fish and vegetables, and medicine bags and boxes used in medical institutions.

A two-dimensional barcode uses black and while rectangular patterns to represent binary data. The pattern image can be decoded after being read to obtain the information contained therein. Among two-dimensional barcodes, quick response (QR) codes are most commonly used. A QR code is in the form of a square with the three corners printed with smaller patterns of "2 concentric squares" to provide positioning function. Generally, the method of reading a two-dimensional barcode is to rely on the recognizable patterns within the four corners of the QR code to determine the position of the QR code.

However, since the positioning function of a two-dimensional barcode must be provided via the recognizable patterns of a fixed amount, the conventional method of reading a two-dimensional barcode can be performed on a single two-dimensional barcode only. If more than two two-dimensional barcodes exist at the same time, the recognizable patterns of different two-dimensional barcodes cause the confusion of the apparatus while reading. Therefore the reading area of the apparatus must be limited, otherwise the scanning must be performed manually to capture images and decode multiple two-dimensional barcodes one by one. There exist the disadvantages of low recognition speed, long processing time, and continuous repetitive actions of the user.

Therefore, it is an important subject of the invention to provide a method of reading multiple two-dimensional barcodes, which allows to recognize multiple two-dimensional barcodes rapidly so that the apparatus using such method can read in a broad range of area to expedite operation processes and reduce manpower and labor consumptions.

SUMMARY OF THE INVENTION

In view of the foregoing subject, an objective of the invention is to provide a method of reading multiple two-dimensional barcodes, which allows a user or patient to recognize multiple two-dimensional barcodes rapidly without capturing pattern images one by one so that the apparatus using such method can read in a broad range of area to expedite operation processes and reduce manpower and labor consumptions. In particularly, the invention can be applied to medicine containers, especially in medical institutions where the problem of the shortage of professional nursing staffs has never been improved.

To achieve the above objective, the present invention discloses a method of reading multiple two dimensional barcodes. The method includes the steps of: obtaining an image including a plurality of positioning patterns and the two dimensional barcodes; defining a reading area within the image according the positioning patterns; dividing the reading area into a plurality of reading blocks, which contain the two dimensional barcodes, respectively; and reading the two dimensional barcodes in the reading blocks individually.

In one embodiment of the invention, the method of reading multiple two dimensional barcodes further comprises a step of: enhancing recognition rates of the two-dimensional barcodes in the image.

In one embodiment of the invention, the enhancing of the recognition rates of the two-dimensional barcodes comprises a brightness contrast enhancing process, a color correction process, a keystone correction process or a noise cancellation process.

In one embodiment of the invention, the method of reading multiple two dimensional barcodes further comprises a step of: whitening the positioning patterns.

In one embodiment of the invention, the positioning patterns are also two-dimensional barcodes.

In one embodiment of the invention, the positioning patterns are disposed around the two-dimensional barcodes.

In one embodiment of the invention, the image includes four of the positioning patterns, and the four positioning patterns are located at four corners of the two-dimensional barcodes.

In one embodiment of the invention, the step of defining the reading area according the positioning patterns includes dividing the image into four portions, and recognizing the positioning patterns according to a library to define the reading area according to the relative positions of the positioning patterns.

In one embodiment of the invention, the reading blocks are divided according to a predetermined array value.

In one embodiment of the invention, the predetermined array is composed by the intersections of a plurality of vertical axes and a plurality of horizontal axes.

In one embodiment of the invention, the sizes of the reading blocks are the same.

In one embodiment of the invention, the method of reading multiple two-dimensional barcodes further comprises a step of: providing another image when a reading fail of any of the two-dimensional barcodes occurs.

As mentioned above, the method of reading multiple two-dimensional barcodes according to the invention can define a reading area through providing positioning patterns, and dividing the reading area into a plurality of reading blocks having the two-dimensional barcodes to achieve the effect of reading multiple two-dimensional barcodes at once. Therefore the advantage of expediting the operation process, making the applied apparatus to read barcodes in a large scope, and reducing manpower and labor can be achieved. Furthermore, when practicing the invention, not only the providing of positioning patterns is simple, the algorithm is not complicated, but also the positioning patterns may be two-dimensional barcodes, therefore it is easy to be combined with existing barcode reading systems, and thus has the advantages of a good integration capability and being easy to practice.

More importantly, the method of reading multiple two-dimensional barcodes according to the invention is suitable for the industries having a lot of containers with two-dimensional barcodes such as storages, logistics or medicine distributions and managements. In particular, medicine distributions and managements need to assistance of the invention since they relate to the safety of medicine usages. In practice, for example medical persons may record the doctor instructions and the medicine-related information on different medicine containers for packaging different medicines directly via the two-dimensional barcodes. After receiving multiple medicine containers and went home, the patient can read the two-dimensional barcodes on multiple medicine containers at once and obtain complete medicine taking information to reduce the inconvenience of reading in order and the risk of operation errors. In the meantime, through the practice of the invention, the labor of filling or outputting medicine notes by the medical persons each time they give medicines can be reduced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
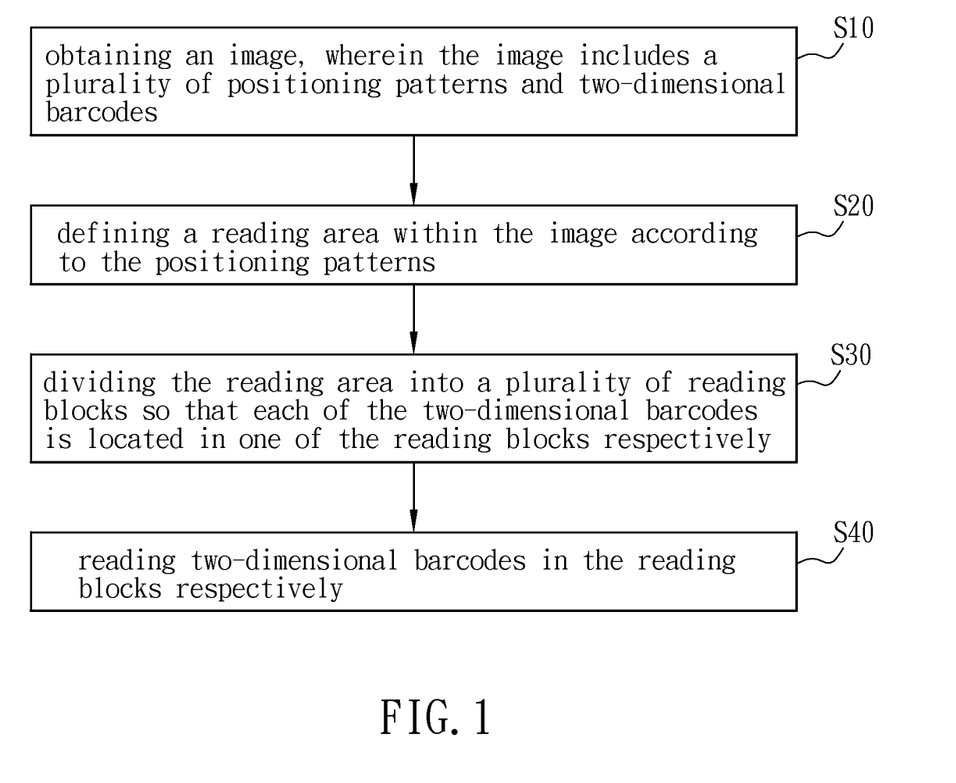
FIG. 1 is a flowchart illustrating the steps of the method of reading multiple two-dimensional barcodes according to a preferred embodiment of the invention.

FIG. 1 is a flowchart illustrating the steps of the method of reading multiple two-dimensional barcodes according to a preferred embodiment of the invention. Referring to FIG. 1, the method of reading multiple two-dimensional barcodes includes the following steps of: obtaining an image, wherein the image includes a plurality of positioning patterns and two-dimensional barcodes (S10); defining a reading area within the image according to the positioning patterns (S20); dividing the reading area into a plurality of reading blocks so that each of the two-dimensional barcodes is located in one of the reading blocks respectively (S30); and reading two-dimensional barcodes in the reading blocks respectively (S40).

The method of reading multiple two-dimensional barcodes of the invention can be used in any industry or field, such as logistics, storages, word processing and business transactions. In particular, the invention can be used for medicine distributions and managements, especially when in a hospital the invention can be used to store medicine in boxes or containers based on different categories to give them to the patients, so that the patients can read relative information after they come back home. Therefore, to make the descriptions clearer and easier to be understood, the preferred embodiment described below uses the example of using the method of reading multiple two-dimensional barcodes to medicine containers and any suitable electronic medicine box. It should be noted that the description of the invention is suitable for any apparatus that uses multiple two-dimensional barcodes and arrange such multiple two-dimensional barcodes into an array, and is not limited to an electronic medicine box.

Figure 2A:
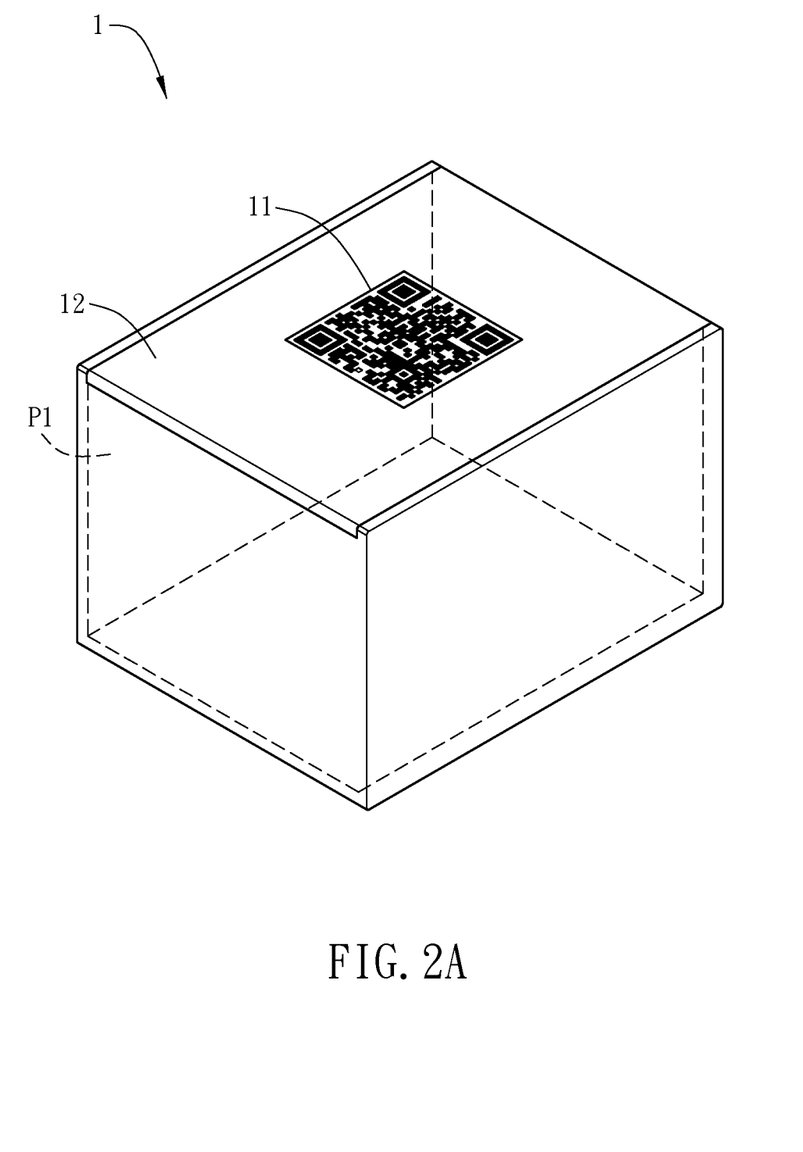
FIG. 2A is a schematic diagram illustrating the appearance of the medicine container used in the method of reading multiple two-dimensional barcodes according to the preferred embodiment of the invention.
Figure 2B:
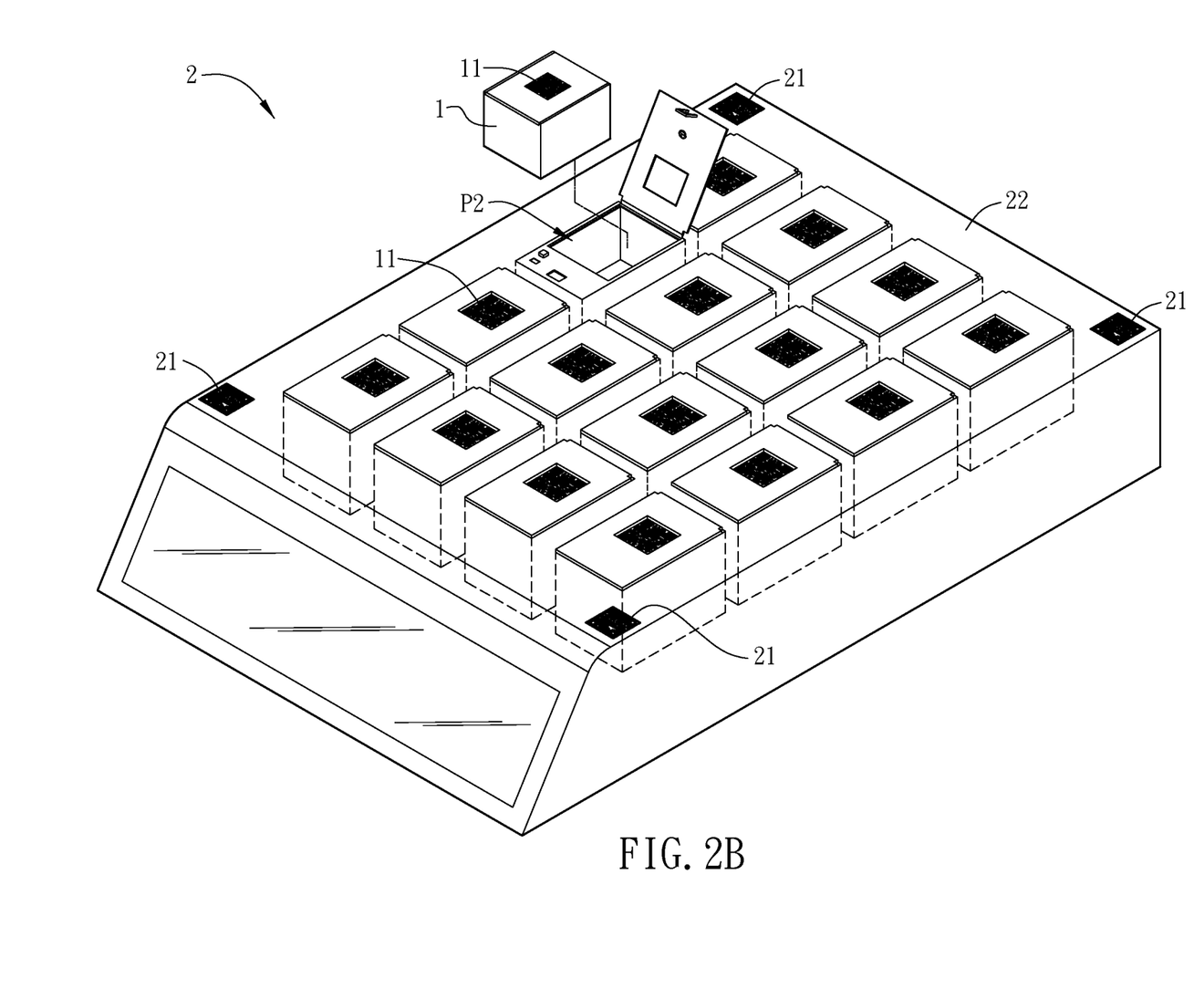
FIG. 2B is a schematic diagram illustrating the appearance of the electronic medicine box cooperating with the medicine container shown in FIG. 2A.
Figure 2C:
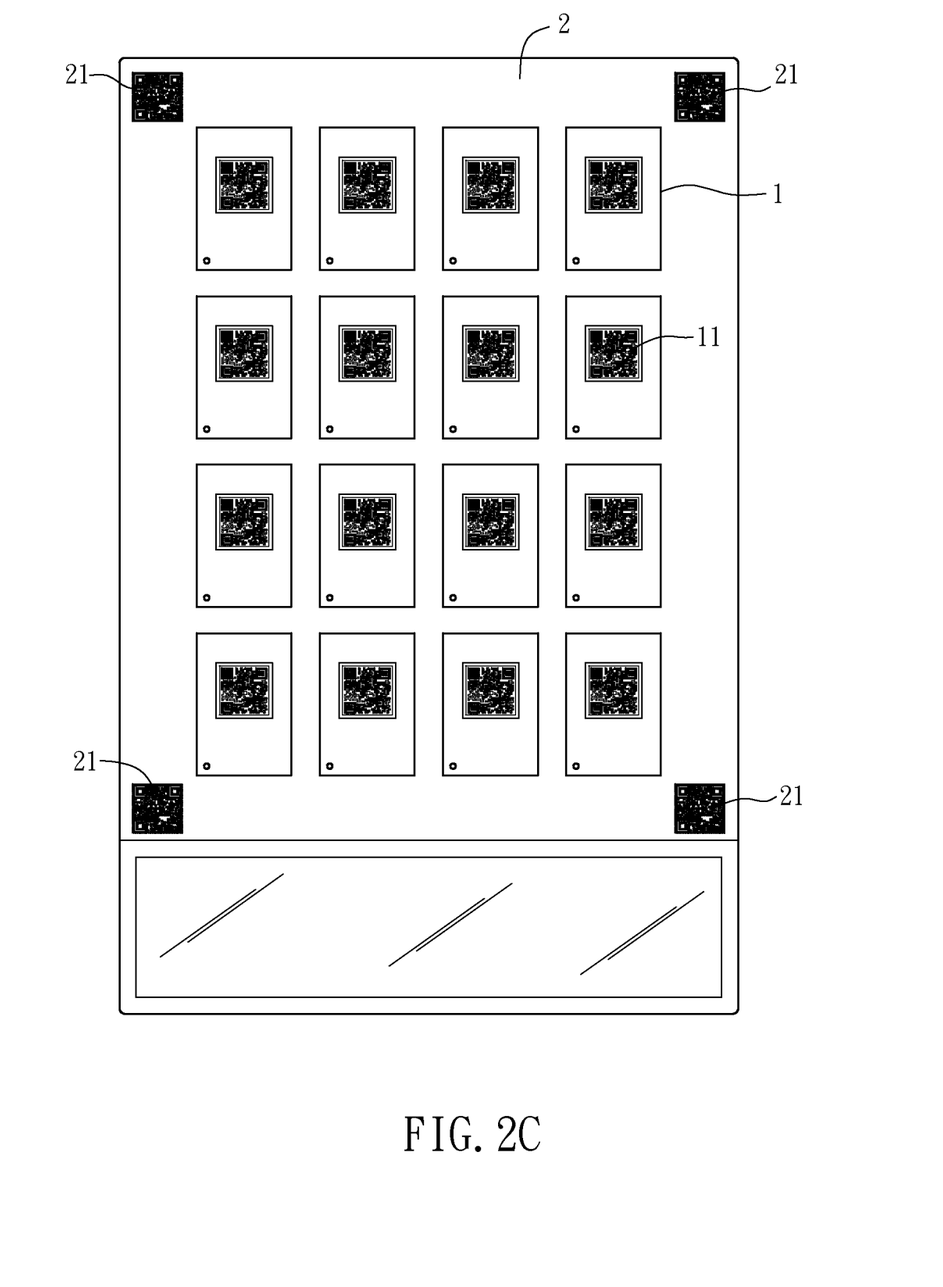
FIG. 2C is the schematic diagram illustrating the top view of the combination of the medicine container and the electronic medicine box shown in FIG. 2A and FIG. 2B.

FIG. 2A is a schematic diagram illustrating the appearance of the medicine container used in the method of reading multiple two-dimensional barcodes according to the preferred embodiment of the invention, FIG. 2B is a schematic diagram illustrating the appearance of the electronic medicine box cooperating with the medicine container shown in FIG. 2A, and FIG. 2C is the schematic diagram illustrating the top view of the combination of the medicine container and the electronic medicine box shown in FIG. 2A and FIG. 2B. Referring to FIGS. 1 and 2A to 2C, a medicine container 1 of the present embodiment is designed to have a medicine accommodation space P1 for accommodating one kind of medicine. Under the monitoring of a professional medical person of a medical institution, the medicine information, such as the medicine taking information, the medicine attributes, the medicine information, the personal information of the patient, the medicine taking times or the dosage can be corresponded correctly. The medicine taking information may include the medicine taking time, the medicine taking frequency, the medicine taking dosage, the taking method or notices. The medicine information may include the information of the appearance and shape of the medicine, the name of the medicine, the storage method or side effects. The personal information may include the name, the medical history number, the medicine allergy or the clinic return arrangement. The information above can be stored in a two-dimensional barcode 11 via two-dimensional barcode editing software. Subsequently, the two-dimensional barcode 11 is stuck or printed on the outer side of the upper cap 12 of the medicine container 1. Of course, the position of the two-dimensional barcode 11 being stuck or printed is not limited. However it is preferred that the position can be exposed after the medicine container 1 being disposed behind the electronic medicine box 2. Moreover, the medicine accommodation and the disposing of the two-dimensional barcode 11 on the medicine container 1 can be performed at the medicine factory during the packaging and shipping out operations.

Therefore, when the patient needs to take, a plurality of different medicines, the patient can obtain different medicine containers 1 with different two-dimensional barcodes 11 printed thereon from the medicine institution. After obtaining the plurality of the medicine container 1, the patient can put them into the accommodation space P2 of the electronic medicine box 2. As described above, since the electronic medicine box 2 corresponds to the medicine container 1, the multiple two-dimensional barcodes 11 as shown in FIG. 2C can be seen from the top. Although the electronic medicine box 2 in the prior art also has the function of reading two-dimensional barcode 11, it is limited by the confusion problem when the multiple two-dimensional barcodes 11 are positions together in line. The two-dimensional barcodes 11 can only be read by manually being placed one by one in front of the electronic medicine box 2 so that the machine can read the two-dimensional barcodes 11 one at a time. The two-dimensional barcodes 11 cannot be read once, which is quite inefficient. Moreover, except for not being economic and practical, the patient needs to remember which medicine containers 1 are recognized and which are not. That is, the patient needs to remember the order of the medicine containers 1, which may cause the problem of repetitive recognitions or an incorrect order.

In the present embodiment, the electronic medicine box 2 has four positioning patterns 21, which are located at the four corners of the top surface 22 of the housing of the electronic medicine box 2 and near the two-dimensional barcodes 11 exposed from the medicine container 1. Therefore, when using an optical capturing apparatus, such as a recorder or a camera, to record or take a picture of the electronic medicine box 2 downwardly from the above, an image 3 including a plurality of positioning patterns and the two-dimensional barcodes can be obtained.

Figure 3:
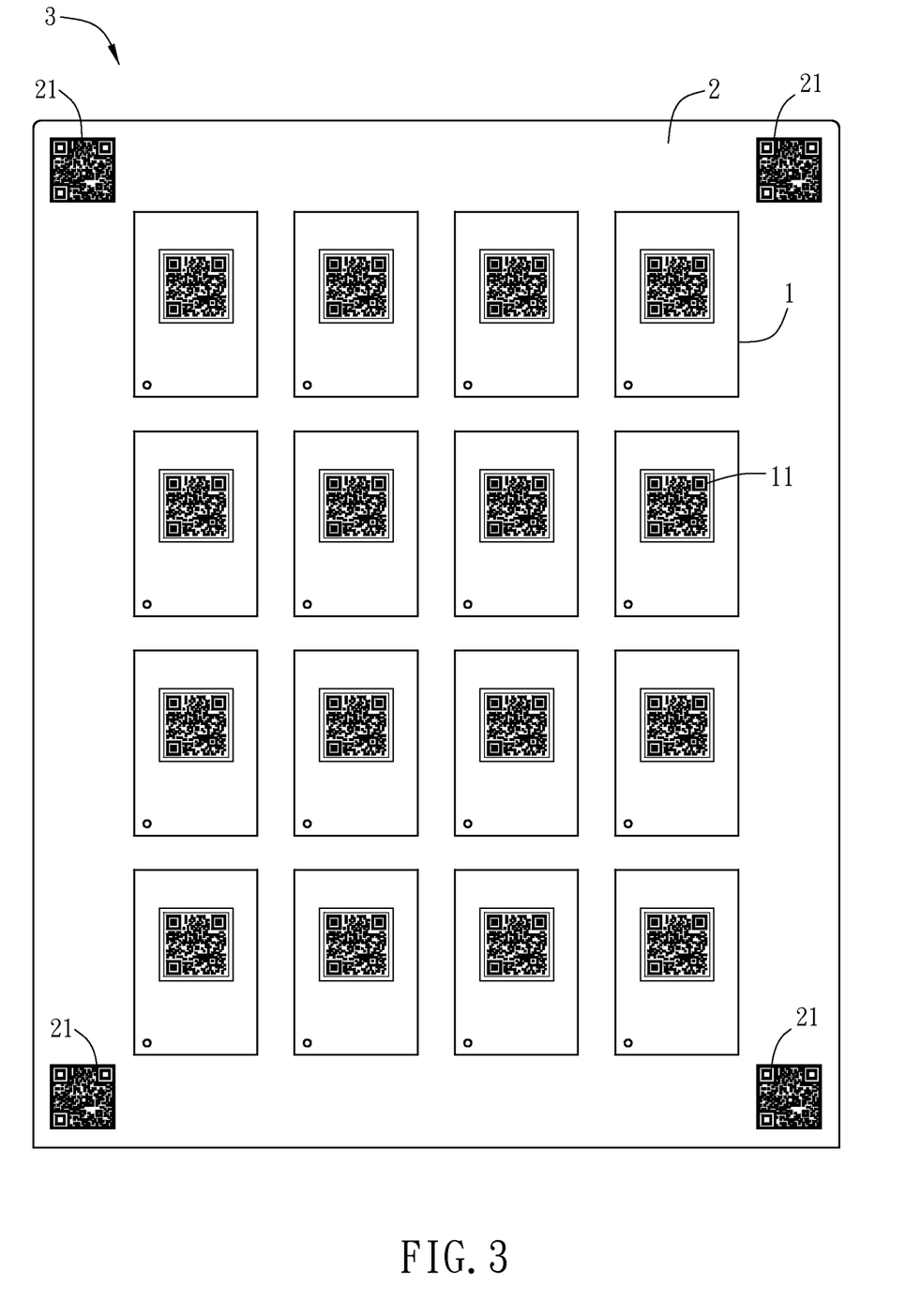
FIG. 3 is a schematic diagram illustrating the image obtained by taking a picture of the medicine container and the electronic medicine box shown in FIG. 2C.
Figure 4:
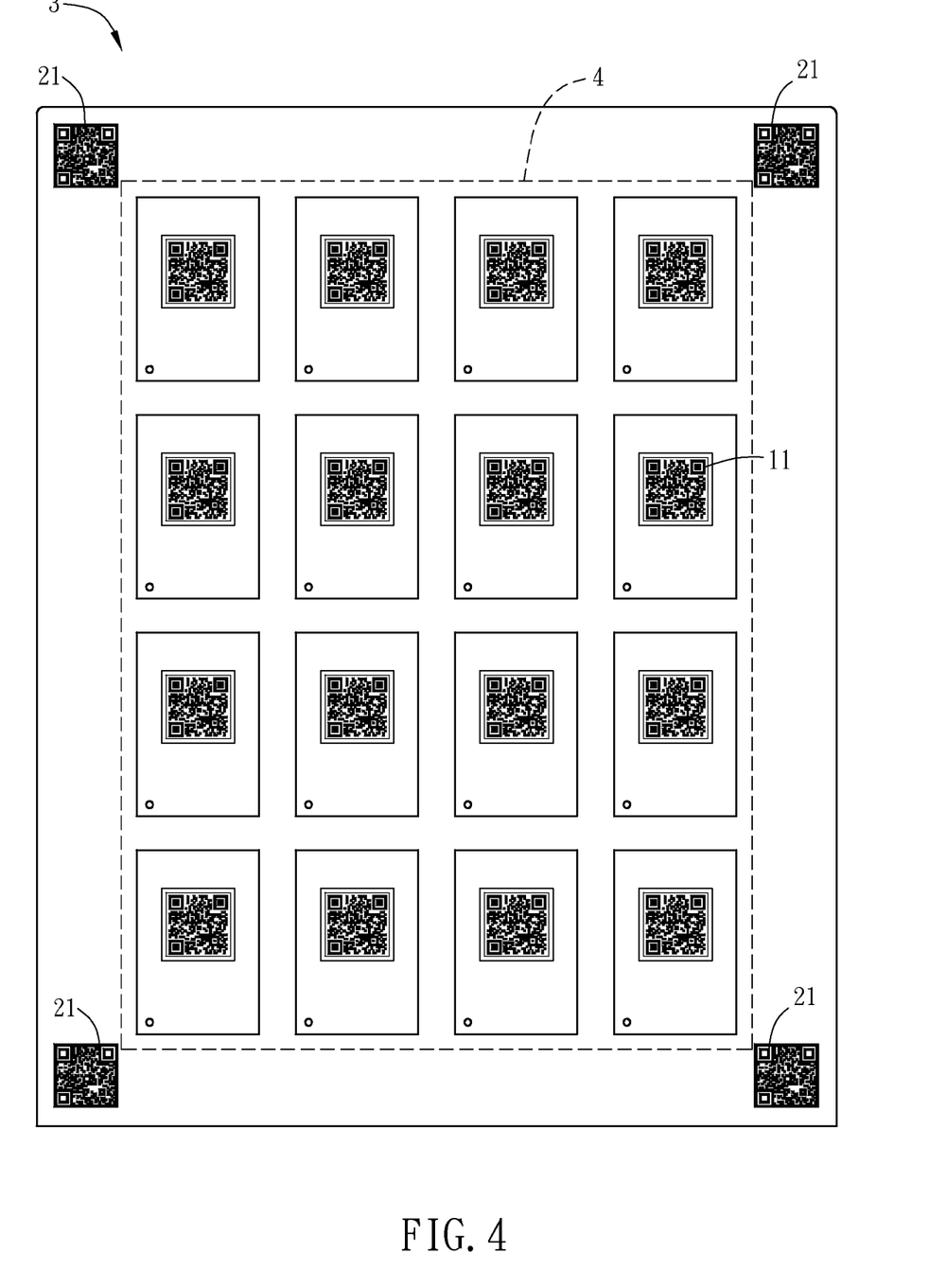
FIG. 4 is a schematic diagram illustrating the defining of the reading area of the image of FIG. 3.

FIG. 3 is a schematic diagram illustrating the image obtained by taking a picture of the medicine container and the electronic medicine box shown in FIG. 2C, and FIG. 4 is a schematic diagram illustrating the defining of the reading area of the image of FIG. 3. With reference to FIGS. 3 and 4, in step S10, an image 3 can be obtained by a photo-taking apparatus. The image 3 includes a plurality of positioning patterns 21 and the two-dimensional barcodes 11, and the positioning patterns 21 are provided at the four corners of the two-dimensional barcodes 11 and around the two-dimensional barcodes 11. In the present embodiment, the positioning patterns 21 are also two-dimensional barcodes, which can be read using the same library and the recognition technique as the two-dimensional barcodes 11 to achieve the advantages of simplifying the algorithm complexity and combining with known techniques. In step S20, a reading area 4 is defined in the image 3 according to the positioning patterns 21.

In details, an algorithm can be used to first divide the image 3 into four portions, and then find the boundary of the positioning patterns 21 on the top surface 22 of the electronic medicine box 2 by recognizing within the four image portions the two neighboring pixels having the larger contrast difference. Afterwards, the four corners of the boundary of the positioning patterns 21 are marked. The scope of the reading area 4 is defined by connecting the innermost corners of the four positioning patterns. It should be noted that based on the method above, the reading area 4 does not include the positioning patterns 21. Certainly, based on the same principle, in other embodiments, for different reading areas of different shapes, the scope may be precisely defined, three, six or eight positioning patterns may be used, or the borderline of the scope may be determined by connecting other corners of the positioning patterns. The invention is not limited herein.

Figure 5:
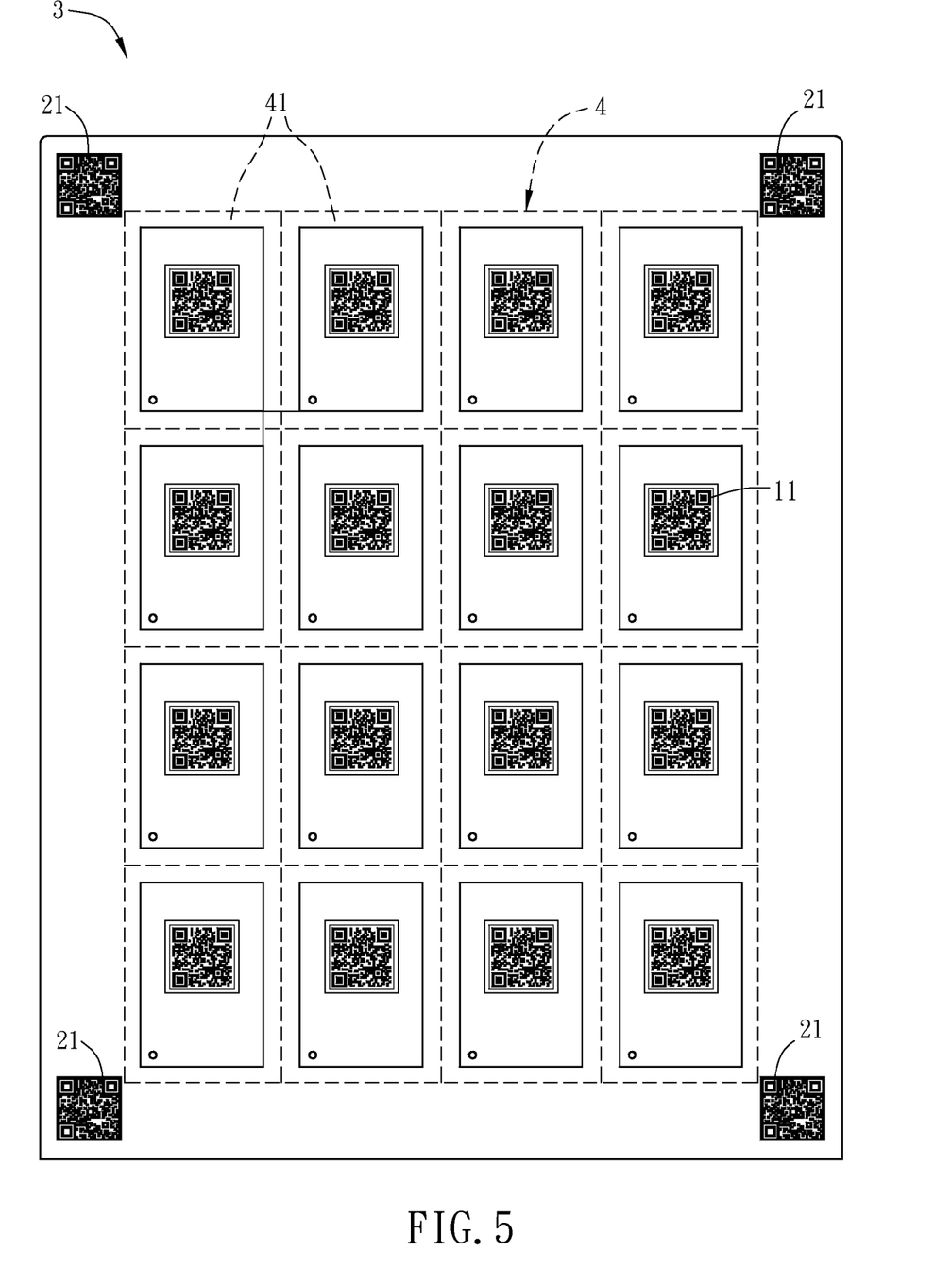
FIG. 5 is a schematic diagram illustrating the dividing of the reading area shown in FIG. 4 into a plurality of reading blocks.

FIG. 5 is a schematic diagram illustrating the dividing of the reading area shown in FIG. 4 into a plurality of reading blocks. Referring to FIG. 5, in step S30, the reading area 4 is divided into a plurality of reading blocks 41, so that each two-dimensional barcode 11 is within one of the reading blocks 41 respectively. Since the algorithm used in the present embodiment is dedicated for the medicine containers 1 and the electronic medicine box 2, the sizes of the medicine containers 1 are substantially the same, and the positions of medicine containers 1 within the electronic medicine box 2 also have a certain degree of regularity, step S30 is to divide the reading area 4 into a plurality of reading blocks 41 by the intersections of a plurality of vertical axes and horizontal axes according to the size of the top covers of the medicine containers 1 and a predetermined array value.

Therefore, in the image 3, the positions of the defined reading blocks 41 are overlapped with the top covers of the medicine containers 1, and the sizes of the reading blocks 41 are the same. Since the two-dimensional barcodes 11 are provided on the top covers of the medicine containers 1, when the defining of the reading blocks 41 are finished, the two-dimensional barcodes 11 in the image 3 are within the reading blocks 41 having the same shapes and sizes. Subsequently, the two-dimensional barcodes 11 in the reading blocks 41 are read one by one via a library to achieve the effect of recognizing multiple two-dimensional barcodes 11 by a single photo shot or scan.

In the above description, the techniques of recognizing the positioning patterns 21 having the form of two-dimensional barcodes and recognizing the two-dimensional barcodes 11 via a library are both comprehensible by persons having ordinary skill in the art, so relevant descriptions are omitted here for concise purpose.

Figure 6:
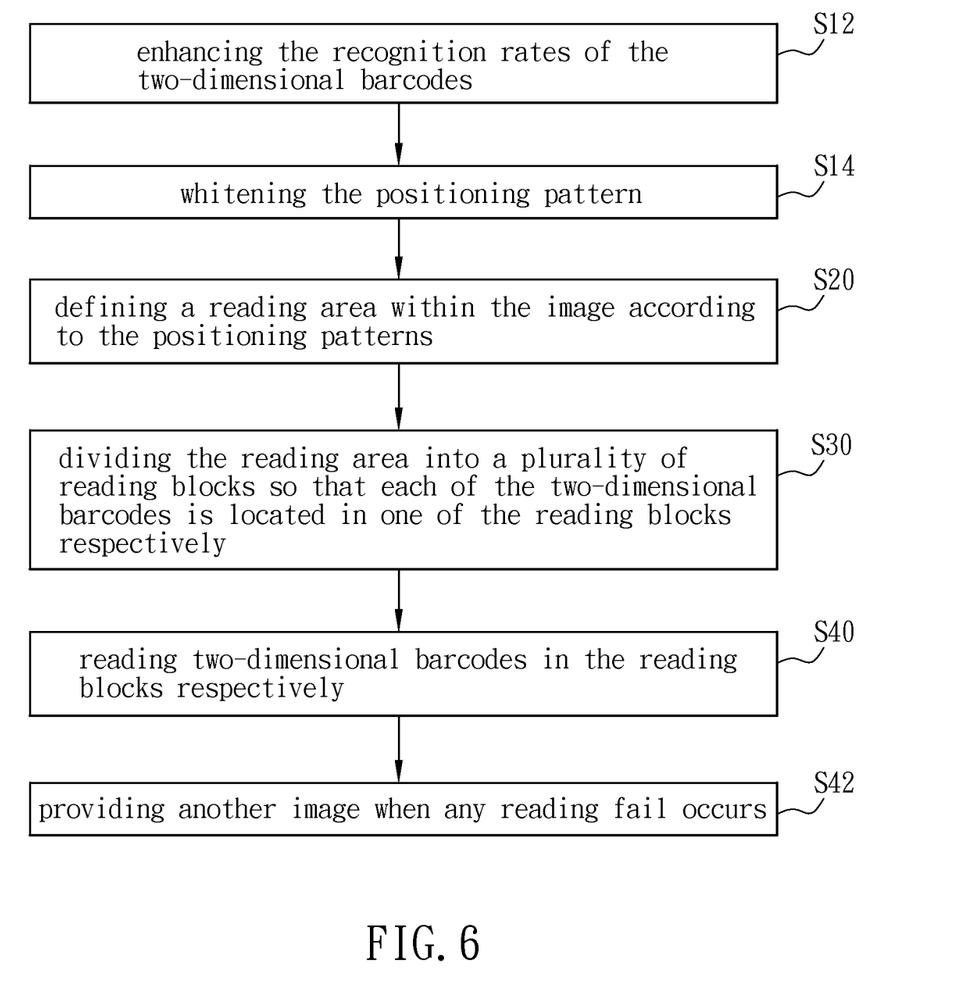
FIG. 6 is a flowchart illustrating the steps of the method of reading multiple two-dimensional barcodes according to another preferred embodiment of the invention.

FIG. 6 is a flowchart illustrating the steps of the method of reading multiple two-dimensional barcodes according to another preferred embodiment of the invention. Referring to FIG. 6, the method of reading multiple two-dimensional barcodes according to another preferred embodiment of the invention is similar to the method of reading multiple two-dimensional barcodes shown in FIG. 1, but further includes the steps of: enhancing the recognition rates of the two-dimensional barcodes (step S12), whitening the positioning pattern (step S14), and providing another image when any reading fail occurs (step S42). The descriptions below focus on these steps, while other steps can be referred to the previous embodiment, which explanations are omitted here for concise purpose.

In step S12, the recognition rates of the two-dimensional barcodes in the image are enhanced to avoid the image-capturing error or the interference existed in the image, which may cause the recognition error. The method includes a brightness contrast enhancing process, a color correction process, a keystone correction process, or a noise cancellation process.

Regarding the brightness contrast enhancing process, since the two-dimensional barcodes are composed of black and white, the brightness contrast enhancing process can emphasize the differences between the black portions and the white portions of the two-dimensional barcodes to avoid determination error. The color correction process can compensate the brightness and shift colors, and the differences between the surrounding images such as the housing of the electronic medicine box and the two-dimensional barcodes can be emphasized in the corrected image. Since the captured image may not be a rectangular pattern due to the camera angle, the image may be corrected to be a rectangular via the keystone correction process to facilitate the subsequent step of dividing reading blocks. Besides, the noise may be enhanced due to the processing of the image (such as brightness contrast enhancing process or the color correction process), so that the noise cancellation process can make the image be recognized more easily.

In the present embodiment, when the positioning patterns are two-dimensional barcodes, the positioning patterns in the image can be whitened by step S14 which is the whitening process for the positioning patterns to disable their positioning function with the two-dimensional barcodes on the medicine containers 1 to avoid the problem of confusion. Therefore the positions of the positioning patterns can be recognized more precisely to define the reading area.

Finally, in step S42, if the reading of any of the two-dimensional barcodes fails, another image is read from the beginning as an auto-feedback control mechanism to avoid the error of missing any information. Certainly, after reading another image from the beginning, the aforementioned steps can be performed again. The details are omitted here for concise purpose.

To sum up, the method of reading multiple two-dimensional barcodes according to the invention can define a reading area through providing positioning patterns, and dividing the reading area into a plurality of reading blocks having the two-dimensional barcodes to achieve the effect of reading multiple two-dimensional barcodes at once. Therefore the advantage of expediting the operation process, making the applied apparatus to read barcodes in a large scope, and reducing manpower and labor can be achieved. Furthermore, when practicing the invention, not only the providing of positioning patterns is simple, the algorithm is not complicated, but also the positioning patterns may be two-dimensional barcodes, therefore it is easy to be combined with existing barcode reading systems, and thus has the advantages of a good integration capability and being easy to practice.

More importantly, the method of reading multiple two-dimensional barcodes according to the invention is suitable for the industries having a lot of containers with two-dimensional barcodes such as storages, logistics or medicine distributions and managements. In particular, medicine distributions and managements need to assistance of the invention since they relate to the safety of medicine usages. In practice, for example medical persons may record the doctor instructions and the medicine-related information on different medicine containers for packaging different medicines directly via the two-dimensional barcodes. After receiving multiple medicine containers and went home, the patient can read the two-dimensional barcodes on multiple medicine containers at once and obtain complete medicine taking information to reduce the inconvenience of reading in order and the risk of operation errors. In the meantime, through the practice of the invention, the labor of filling or outputting medicine notes by the medical persons each time they give medicines can be reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of reading multiple two-dimensional barcodes, comprising the steps of:
   obtaining an image, the image including a plurality of positioning patterns and the two-dimensional barcodes;
   generating a boundary of each of the positioning patterns;
   marking four corners of the boundary of each of the positioning patterns;
   connecting an innermost corner of each of the positioning patterns to define a reading area;
   dividing the reading area into a plurality of reading blocks, each of the two-dimensional barcodes being positioned in one of the reading blockings respectively; and
   reading the two-dimensional barcodes in the reading blocks respectively.

2. The method according to claim 1, further comprising the step of:
   enhancing recognition rates of the two-dimensional barcodes in the image.

3. The method according to claim 2, wherein the enhancing of the recognition rates of the two-dimensional barcodes comprises a brightness contrast enhancing process, a color correction process, a keystone correction process or a noise cancellation process.

4. The method according to claim 1, further comprising the step of:
   whitening the positioning patterns.

5. The method according to claim 1, wherein the positioning patterns are also two-dimensional barcodes.

6. The method according to claim 1, wherein the positioning patterns are disposed around the two-dimensional barcodes.

7. The method according to claim 1, wherein the step of defining the reading area according the positioning patterns includes:
   dividing the image into four portions; and
   recognizing the positioning patterns according to a library to define the reading area according to the relative positions of the positioning patterns.

8. The method according to claim 1, wherein the reading blocks are divided according to a predetermined array value.

9. The method according to claim 8, wherein the predetermined array is composed by the intersections of a plurality of vertical axes and a plurality of horizontal axes.

10. The method according to claim 1, wherein the sizes of the reading blocks are the same.

11. The method according to claim 1, further comprises the step of:
    providing another image when a reading fail of any of the two-dimensional barcodes occurs.

* * * * *